(12) United States Patent
Hermann et al.

(10) Patent No.: US 11,637,438 B2
(45) Date of Patent: Apr. 25, 2023

(54) BATTERY POWERED ELECTRICAL APPLIANCE FOR PERSONAL HYGIENE

(71) Applicant: The Procter & Gamble Company, Cincinnati, OH (US)

(72) Inventors: Ferdinand Hermann, Königstein (DE); Torsten Klemm, Eschborn (DE); Andreas Erndt, Kelkheim (DE)

(73) Assignee: The Procter & Gamble Company, Cincinnati, OH (US)

( * ) Notice: Subject to any disclaimer, the term of this patent is extended or adjusted under 35 U.S.C. 154(b) by 352 days.

(21) Appl. No.: 17/151,948

(22) Filed: Jan. 19, 2021

(65) Prior Publication Data
US 2021/0226465 A1 Jul. 22, 2021

(30) Foreign Application Priority Data
Jan. 17, 2020 (EP) .................................... 20152383

(51) Int. Cl.
| | |
|---|---|
| G05F 1/40 | (2006.01) |
| H02J 7/00 | (2006.01) |
| A46B 13/02 | (2006.01) |
| A46B 15/00 | (2006.01) |
| B26B 21/40 | (2006.01) |
| A61C 17/22 | (2006.01) |

(52) U.S. Cl.
CPC ............ *H02J 7/0063* (2013.01); *A46B 13/02* (2013.01); *A46B 15/0004* (2013.01); *B26B 21/4056* (2013.01); *A61C 17/221* (2013.01)

(58) Field of Classification Search
CPC .............................. H02J 7/0063; H02J 7/0069
See application file for complete search history.

(56) References Cited

U.S. PATENT DOCUMENTS

| | | | | |
|---|---|---|---|---|
| 2003/0098679 A1* | 5/2003 | Odaohhara | ............. | H02J 7/345 323/284 |
| 2011/0314677 A1* | 12/2011 | Meier | ................ | A46B 15/0002 30/41.8 |
| 2016/0365741 A1 | 12/2016 | Klemm et al. | | |

FOREIGN PATENT DOCUMENTS

| | | |
|---|---|---|
| JP | S5295074 A | 8/1977 |
| JP | S59149175 A | 8/1984 |
| JP | H01150332 A | 6/1989 |
| WO | 2016199008 A1 | 12/2016 |

OTHER PUBLICATIONS

European search report dated Apr. 1, 2020.

* cited by examiner

*Primary Examiner* — Muhammad S Islam
(74) *Attorney, Agent, or Firm* — Kevin C. Johnson; Gerd Zetterer

(57) ABSTRACT

The present invention relates to the field of battery powered electrical appliances or personal hygiene, in particular to a hair removal device such as an electric shaver or epilator as well as an electric toothbrush. A control device for a battery powered electrical appliance for personal hygiene is described, wherein the control device is adapted to cause the battery powered electrical appliance to perform automated contact fritting of a battery contact by controlling the battery powered electrical appliance such that a current pulse exceeding a wetting threshold is applied across the battery contact during a standby period.

13 Claims, 3 Drawing Sheets

BATTERY POWERED ELECTRICAL APPLIANCE FOR PERSONAL HYGIENE

FIELD OF THE INVENTION

The present invention relates to the field of battery powered electrical appliances for personal hygiene, in particular to a hair removal device such as an electric shaver or epilator as well as an electric toothbrush. The present invention furthermore relates to a control device for a battery powered electrical appliance for personal hygiene, a corresponding method and computer program for carrying out said method.

BACKGROUND OF THE INVENTION

Battery powered electrical appliances for personal hygiene such as electric shavers, epilators and electric toothbrushes are well known in the art. In the upper price segment, high performance batteries such as lithium-ion batteries are becoming increasingly popular to satisfy the demand for compact, lightweight devices which at the same time provide a long time period, e.g. several days or weeks, for which the appliance can be used without recharge. This may be particularly advantageous while travelling.

Moreover, it would be desirable that the appliance is still ready for use even after an extended period of time without being used. Therefore, manufacturers tend to reduce the power consumption during standby as much as possible.

SUMMARY OF THE INVENTION

It is an object of the present invention to provide a further improved battery powered electrical appliance for personal hygiene and control device for such a battery powered electrical appliance for personal hygiene. In particular, it would be advantageous to further improve the period of time (number of days or weeks) for which a battery powered electrical appliance for personal hygiene can be used without recharge.

In a first aspect of the present invention a control device for a battery powered electrical appliance for personal hygiene is presented. The control device is adapted to cause the battery powered electrical appliance to perform automated contact fritting of a battery contact by controlling the battery powered electrical appliance such that a current pulse exceeding a wetting threshold is applied across the battery contact during a standby period.

In a further aspect of the present invention cattery powered electrical appliance for personal hygiene is presented, the appliance comprising the control device as disclosed herein.

In yet further aspects of the present invention, there are provided a corresponding control method, a computer program which comprises program code means for causing a computer to perform the steps of the control method disclosed herein when said computer program is carried out on a computer as well as a non-transitory computer-readable storage medium that stores therein a computer program product, which, when executed by a processor, causes the control method disclosed herein to be performed.

Preferred embodiments of the invention are defined in the dependent claims. It shall be understood that the claimed method, system, computer program and medium have similar and/or identical preferred embodiments as the claimed system, in particular as defined in the dependent claims and as disclosed herein.

The inventors recognized that battery powered electrical appliance for personal hygiene are actively used only for very limited periods of time and remain in a low power standby mode for the rest of the time, waiting to be activated. Moreover, these devices may be subject to highly variable use patterns. For example epilators tend to be more frequently used in summer than in winter. But also for shavers it may be the case that the user does not shave over the weekend or for extended periods while travelling or on holiday.

Accordingly, to increase the standby time, manufacturers tend to reduce the power consumption during standby as much as possible. However, eventually a voltage level sensed at a control device of the battery powered electrical appliance for personal hygiene may have dropped to such a low level that the device either turns off completely or prevents the user from turning the device on in order to prevent a deep discharge of the battery. This can be referred to as a shutdown condition. The standby time is thus limited.

The inventors have found that, surprisingly, a targeted increase of the power consumption may under certain boundary conditions help to increase the possible standby time that can be reached. At first glance, this may seem counterintuitive to increase the standby time based on a measure that increases the power consumption. In certain embodiments, a battery powered electrical appliance for personal hygiene may comprise electrical contacts, such as spring contacts, for contacting the battery. For cost savings, the contacts may be manufactured from an ignoble material. A drawback of such contacts is that in particular in environments with high humidity (as in showers or bathrooms where electrical appliances for personal hygiene are typically used) a thin film of oxidation, or an otherwise passivated layer, tends to form and, along with surface roughness, may significantly increase a contact resistance of the battery contact interface. The inventors recognized that the contact resistance may already increase on time scales that are relevant for typical use scenarios for the specific case of battery powered electrical appliances for personal hygiene.

The contact resistance may lead to a voltage drop that may reduce an apparent battery voltage measured within the appliance. Consequently, the measured battery voltage may be lower than the actual battery voltage such that the appliance may enter a premature shutdown condition, even though the appliance may still have been operated for a longer period of time. Hence, in contrast to the conventional approach of reducing the power consumption as much as possible, it is suggested to cause the battery powered electrical appliance to perform automated contact fritting of a battery contact by controlling the battery powered electrical appliance such that a current pulse exceeding a wetting threshold is applied across the battery contact during a standby period. Hence, even though the contact fritting consumes some energy, the overall time during which the battery powered electrical appliance for personal hygiene may be used can be increased.

A further advantage of the proposed solution is that even for existing product designs, the possible standby time may be increased by implementing a different control function into a control device. Hence, instead of increasing the device cost, e.g. by choosing electric contacts made from a noble material, or the manufacturing effort, e.g. by soldering the battery directly into the appliance, the period of time for which the appliance can be used without recharge can be increased in a very efficient manner. The proposed solution can thus enable the use of cheaper contact materials and the use of detachable (spring) contacts rather than fixed soldering of the battery. This may also improve serviceability, recyclability and contribute to sustainable product cycles.

In the following, some terms which are used throughout the application, shall be shortly explained and defined:

As used herein, the term wetting current may refer to a minimum electric current needing to flow through a contact to break through the surface film resistance at a contact. It will be understood that the actual value may depend and the materials involved and the environmental conditions such as humidity levels.

As used herein, contact fritting may refer to the process of destroying a surface film of a contact in particular by application of a high electric field or current. By destroying the surface film, the contact resistance may be reduced again, preferably to a reproducible nominal contact resistance.

As used herein, a computer may refer to a device adapted to execute machine readable instructions, including but not limited to a microcontroller (µC), ASIC, FPGA, microprocessor or a general purpose computer.

The control device may be adapted to cause the battery powered electrical appliance to apply the current pulse exceeding the wetting threshold across the battery contact by temporarily activating at least one of an electric motor and a heating element of the battery powered electrical appliance for personal hygiene. An advantage of this embodiment can be that an already existing system component that is needed for performing the bodily hygiene function is used a load for drawing the current pulse. Consequently, a synergy effect may be achieved.

In a further refinement, the control device may be adapted to cause the battery powered electrical appliance to temporarily activate the electric motor such that the electric motor draws a starting current exceeding the wetting threshold. The control device may further be adapted to cause the battery powered electrical appliance to deactivate the electric motor within less than 10 ms, in particular within less than 5 ms, in particular within less than 1 ms. In addition or in the alterative, the control device may be adapted to cause the battery powered electrical appliance to deactivate the electric motor prior to setting the electric motor in motion. Hence, the initial high startup current may be used for contact fritting. However, the motor may be activated only for a very short period of time and even be deactivated before the electric motor is set in motion. An advantage of this embodiment is that, even though the motor is used as a load for contact fritting, the process may occur in silence or at least with limited disturbance of the user.

The control device may be adapted to cause the battery powered electrical appliance to apply the current pulse having a peak current of at least one of at least 100 mA, at least 250 mA, at least 500 mA and at least 1 A; and a duration of at least one of less than 10 ms, less than 3 ms, less than 1 ms and less than 500 µs across the battery contact. In addition or in the alternative the control device may be adapted to cause the battery powered electrical appliance to apply a current pulse having a peak current of at least one of no more than 20 A, in particular no more than 10 A, in particular no more than 5 A, in particular no more than 3 A across the battery contact. For example, contact fritting may be effected using a peak current of I=2.5 A and a duration of t=200 µs. The pulse duration may refer to a FWHM (full width at half maximum).

The control device may be adapted to cause the battery powered electrical appliance to apply the current pulse such that, during automated contact fritting, a current across the battery contact exceeds an average standby current by a factor of at least 1.000.

The control device may be adapted to cause the battery powered electrical appliance to perform a sequence of automated contact fritting and a subsequent voltage measurement. Accordingly, a voltage measurement may preferably be performed directly after contact wetting. Thereby, an accurate reading of the battery voltage may be obtained. In view of this measurement, a premature shutdown of the appliance may be avoided, as explained in more detail above.

The control device may be adapted to cause the battery powered electrical appliance to perform a sequence of automated contact fritting, followed by a waiting period and a subsequent voltage measurement after the waiting period. In particular, the waiting period can be in a range of at least one of: (a) between 15 min and 6 h, (b) between 20 min and 4 h, (c) between 30 min and 3 h, and (d) between 45 min and 2 h. It shall be understood that any of the lower values of the ranges may be combined with any of the upper values of the ranges to provide a further range. Hence, the voltage measurement is not necessarily performed immediately after the contact fritting. An advantage of this embodiment is that a more accurate voltage measurement may be achieved. It should be noted that the introduction of the waiting period may seem counterintuitive because during the waiting period after the contact fritting, the contact surface may again be subject to formation of e.g. an oxide layer on an ignoble contact material. However, it has been found that the measurement accuracy may nevertheless be improved.

The control device may be adapted to cause the battery powered electrical appliance to perform automated contact fritting of the battery contact at predetermined time intervals. For example, the control device may be adapted to cause the battery powered electrical appliance to perform automated contact fritting of the battery contact at least once in a time period of at least one of 48 hours, 36 hours, 24 hours, 18 hours, 12 hours, 8 hours, 6 hours and 4 hours. An advantage of this embodiment is that the formation of a thick layer at the battery contact may be avoided. Consequently, by perform automated contact fritting of the battery contact repeatedly at predetermined time intervals, the contact resistance may be permanently kept a sufficiently low level such that reliable monitoring of the battery voltage is possible. Moreover, since no thick layers are formed at the battery contact, lower fritting currents may be sufficient. Thereby, the method may even be applied for low power appliances for personal hygiene that are e.g. only equipped with a low power motor. Nonetheless, even a low power motor may then serve as the load for such a repeated contact fritting.

In addition or in the alternative, the control device may be adapted to cause the battery powered electrical appliance to perform automated contact fritting of the battery contact (a) at a predetermined time of the day; and/or (b) at a predetermined time after usage of the battery powered electrical appliance for personal hygiene. The predetermined time of the day may also refer to a time window. Several time windows may be provided. For example, the contact fritting may be performed in a time window between 12 am and 4 pm or time window when the user is expected to be absent. Thereby, even if the control device briefly activates a motor as a load and causes a noise, the user may not be disturbed. A similar effect may be achieved if the control device is adapted to cause the battery powered electrical appliance to perform automated contact fritting of the battery contact at a predetermined time after usage of the battery powered electrical appliance for personal hygiene. In a typical use case, a user may use the appliance before going out, e.g. going to work or to leisure activities. Accordingly, by performing the automated contact fritting at a predetermined time after usage, the contact fritting may occur increase the likelihood that the contact fritting does not disturb the user. It shall be understood that the time(s) or time window(s) may be adjusted based on user preferences.

The control device may be adapted to cause the battery powered electrical appliance to wake up during the standby period, in particular wake up to an intermediate power state, to perform said automated contact fitting, in particular in said intermediate power state. For example, an interrupt may be triggered while the device is in a standby state to wake up the appliance to an intermediate power state. An intermediate power state may refer to a state having a power consumption between an energy saving standby state and an operational state during use of the electrical appliance for personal hygiene. After performing the contact fritting and optionally a subsequent measurement of the battery voltage, the appliance and control device may resume to standby state.

The control device may be adapted to receive a trigger signal and to cause the battery powered electrical appliance to perform automated contact fritting of the battery contact in response to said trigger signal. For example, the control device may receive a trigger signal from a sensor. For example, a trigger signal may be provided if a temperature sensor reaches a threshold value or if a motion sensor detects a motion of the battery powered electrical appliance for personal hygiene. Thereby, the contact fritting may be performed e.g. at a state where a correct reading of the battery voltage may be critical, e.g. when approaching a critical temperature or when the appliance is picked up such that the device may immediately be ready when needed.

The battery powered electrical appliance for personal hygiene may be a hair removal device, in particular a shaver or epilator, or an electric toothbrush or a massage device. Generally speaking, the electrical appliance for personal hygiene may comprise an electric motor, a heating element or a light source, e.g. in a light based hair removal device. The appliance can be adapted to establish an electrical connection between the battery contact and an existing load for dissipating the wetting current, such as a motor, a heating element or a light source, thereby providing a synergy effect since no dedicated separate load is required.

The battery powered electrical appliance for personal hygiene may comprise a battery contact, wherein the battery contact comprises an ignoble electrical contact for contacting the battery. The battery contact may be spring contact.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
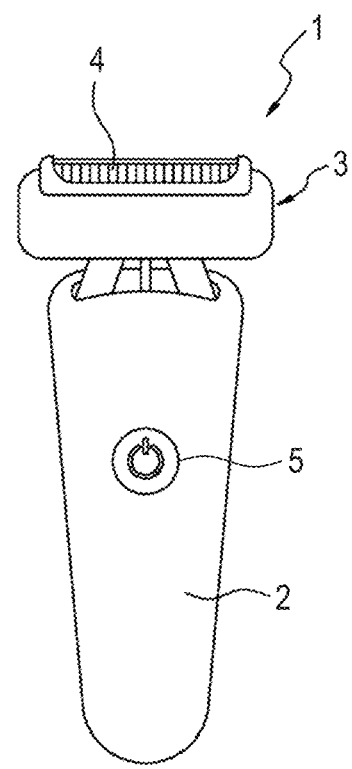
FIG. 1 shows a schematic diagram of a first embodiment of a battery powered electrical appliance for personal hygiene.

FIG. 1 schematically shows a first embodiment of a battery powered electrical appliance for personal hygiene in form of an electric shaver. The appliance is therein denoted in its entirety by reference numeral 1. The shaver comprises a main body 2 and a shaver head 3 as generally known in the art. One or more razor blades 4 in the shaver can be set in motion by an electric motor (not shown) within the main body. A battery (not shown), in particular a lithium-ion battery, within the main body may serve as the energy source to power the device.

Figure 2:
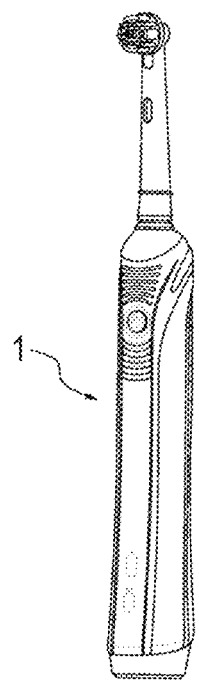
FIG. 2 shows a schematic diagram of a second embodiment of a battery powered electrical appliance for personal hygiene.

Accordingly, FIG. 2 shows a further embodiment of a battery powered electrical appliance 1 for personal hygiene in form of an electric toothbrush. Further embodiments of a battery powered electrical appliance for personal hygiene may refer to other forms of hair removal devices, such as epilators or light pulse based hair removal devices, or massage devices.

Figure 3:
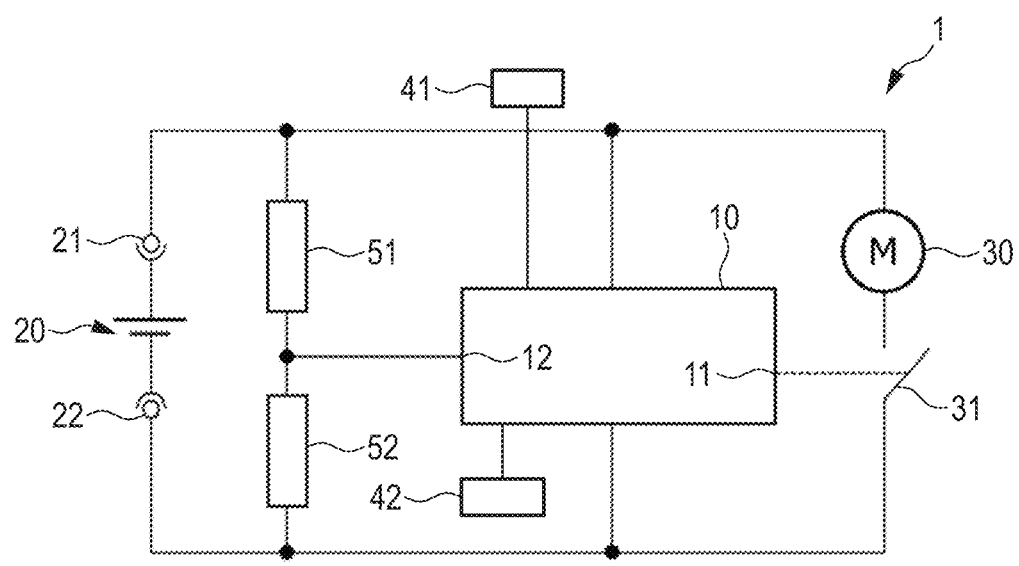
FIG. 3 shows a schematic block diagram including a control device for controlling a battery powered electrical appliance for personal hygiene.

FIG. 3 shows a block diagram which schematically illustrates the components of a battery powered electrical appliance 1 for personal hygiene as e.g. shown in FIG. 1 and FIG. 2 as well as their connections to each other.

Figure 4:
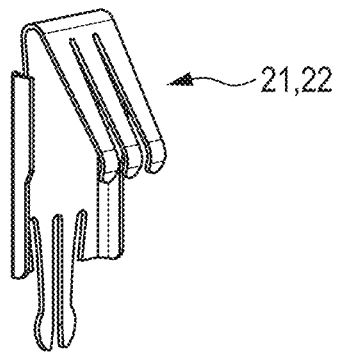
FIG. 4 shows an exemplary battery contact.

As shown in FIG. 3, the appliance 1 may comprises a control device 10, a battery 20 and a load such as a heating element or electric motor 30. The battery 20 supplies the appliance 1 with electrical energy via battery contacts 21, 22. An exemplary battery contact 21, 22 is shown in FIG. 4 in form of a spring contact. Using a battery contact 21, 22 instead of soldering the battery into the device may have several advantages. For example, the cost for a bill of material and/or a manufacturing process may be reduced. In particular, the manufacturing process may be further automated compared to a manual solder process that can be prone to errors. Moreover, the reparability and the overall sustainability of the product may be further improved when using a battery contact 21, 22 for contacting the battery by clamping instead of soldering the battery into the device. Nonetheless, for reducing the cost it would be desirable to use a material with limited cost. Hence, instead of a noble contact e.g. a gold contact, it would be desirable to use lower cost materials, e.g. Wieland copper. However, lower cost or ignoble contact materials may be prone to the formation of oxidation or surface layers, which may reduce the contact resistance over time such that in conventional battery powered electrical appliance for personal hygiene a negative on the standby-time may occur as described in detail above.

Referring again to FIG. 3, the a battery powered electrical appliance 1 for personal hygiene thus comprises a control device 10 that is adapted to cause the battery powered electrical appliance to perform automated contact fritting of a battery contact by controlling the battery powered electrical appliance such that a current pulse exceeding a wetting threshold is applied across the battery contact during a standby period. For example, the appliance may comprise a motor 30 that can be activated via a switch 31. The switch 31 may be controlled by the control device 10. For example, the switch 31 may be a semiconductor switch such as a MOSFET that is operated by a control output 11 of the control device 10. However, different types of switches may be used. The switch 31 may be a separate element or may be part of the control device 10. The switch 31 may stablish an electrical connection of the motor 30 to the battery 20 via the battery contacts 21, 22. Hence, a current drawn by the motor 30 passes through the battery contacts 21, 22. Thereby, not only a weak control device standby current is applied across the battery contacts but also a much higher current to (temporarily) supply the motor 30. Moreover, a different type of load such as e.g. a heating element or light source may be used. Generally speaking, the control device 10 may be adapted to cause the battery powered electrical appliance 1 to apply the current pulse exceeding the wetting threshold across the battery contact by temporarily activating at least one of an electric motor and a heating element of the battery powered electrical appliance for personal hygiene.

Temporarily operating a load may cause noises if the load involves a movable element. In an advantageous embodiment, the control device 10 is adapted to cause the battery powered electrical appliance 1 to temporarily activate the electric motor 30 such that the electric motor 30 draws a starting current exceeding the wetting threshold and to deactivate the electric motor 30 within a short period of time of e.g. less than 10 ms, in particular to deactivate the motor prior 30 to setting the electric motor 30 in motion. Hence, undesirable noises can be minimized while still achieving a synergistic effect that an existing motor is used for causing a sufficiently high current pulse for contact fritting.

Figure 5:
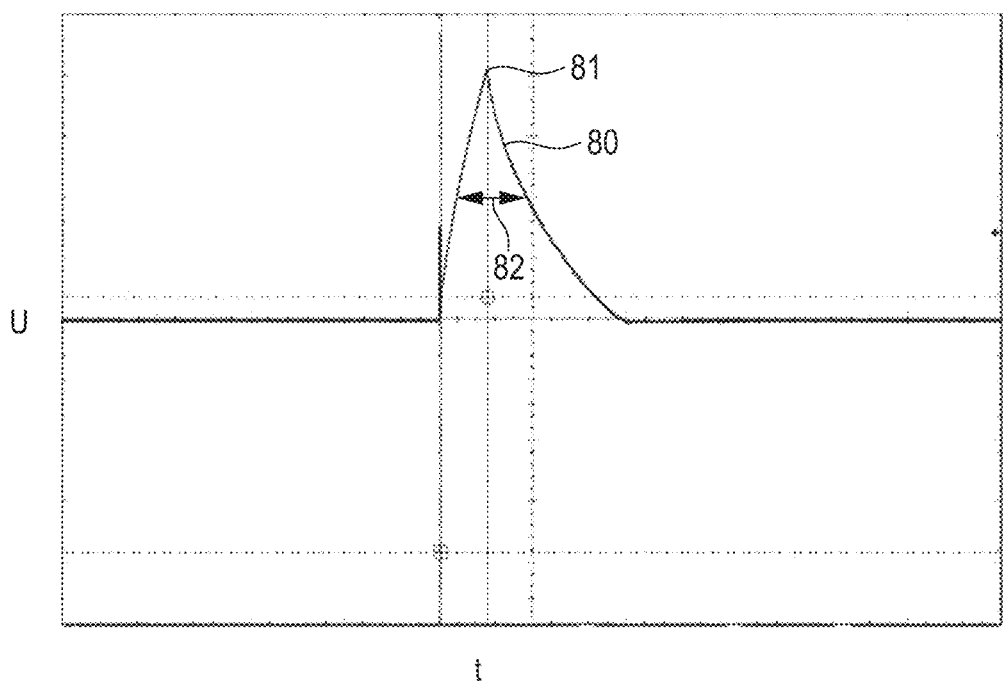
FIG. 5 shows a graph of a current pulse for automated contact fritting.

FIG. 5 shows a graph of a current pulse 80 for automated contact fritting. The current pulse may have a peak current 81 of at least one of at least 100 mA, at least 250 mA, at least 500 mA and at least 1 A. The pulse may have a duration 82 of at least one of less than less than 10 ms, less than 3 ms, less than 1 ms and less than 500 µs across the battery contact. The pulse duration 82 may refer to a FWHM (full width at half maximum) pulse width. In the shown example in FIG. 5, the pulse may have a peak current 81 may be I=2.5 A and a duration 82 may be t=200 µs.

Referring again to FIG. 3, the appliance 1 may further comprise an input 41 and a sensor 42. The input 41 may be used to receive control information such as a trigger signal. For example, the input 41 may provide an input signal from a power button 5, as e.g. illustrated in FIG. 1. In addition or in the alternative, the appliance may comprise a sensor 42. The sensor can be part of the control device 10 or may be a separate part. The sensor 42 or input 41 may provide a trigger signal to the control device 10. The control device 10 may be adapted to receive the trigger signal and to cause the battery powered electrical appliance to perform automated contact fritting of the battery contact in response to said trigger signal.

Figure 6:
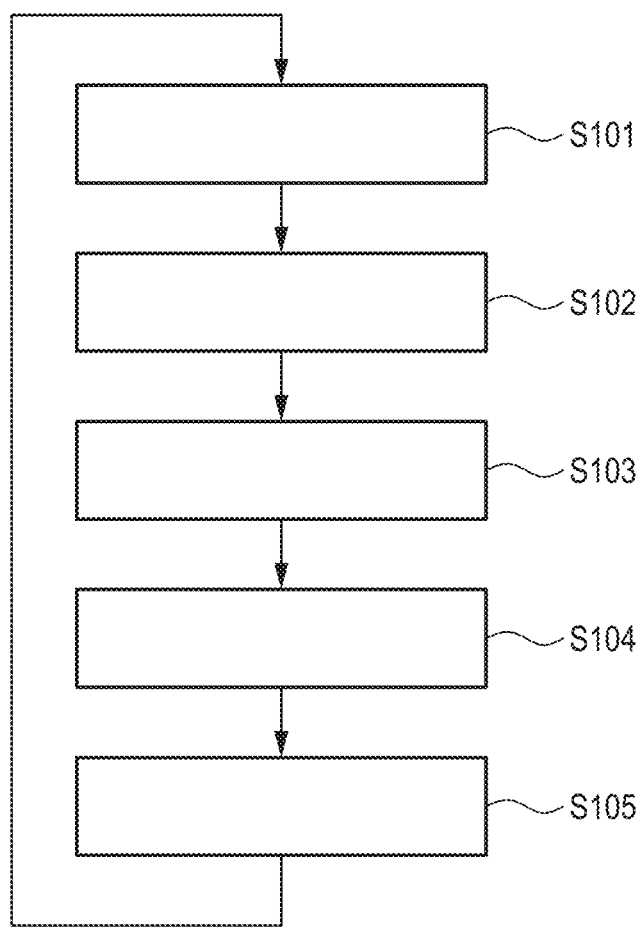
FIG. 6 shows a flow chart of a method according to an aspect of the present disclosure.

FIG. 6 shows a flow chart of a method according to an aspect of the present disclosure. The method can be performed by the battery powered electrical appliance 1 for personal hygiene, in particular by the control device 10. In a general aspect the method comprising the step of causing the battery powered electrical appliance to perform automated contact fritting of a battery contact by controlling the battery powered electrical appliance such that a current pulse exceeding a wetting threshold is applied across the battery contact during a standby period.

The process in as shown in FIG. 6 starts in the standby state in step S101. In step S102 automated triggering during a standby state occurs. This may be externally triggered by a sensor or input trigger signal. However, preferably a timer is provided and the automated contact fritting of the battery contact is triggered and performed at predetermined time intervals.

In step S103, contact fritting is performed. The contact fritting may be performed automatically by the battery powered electrical appliance for personal hygiene. In particular, a control device of the appliance may cause the appliance to perform automated contact fritting, for example by controlling a switch 31 to temporarily close such that a startup current is drawn by the motor 30 which leads to contact fritting at the battery contacts 21, 22 (see FIG. 3).

In step S104, the method may comprise an optional waiting period. The waiting period may be controlled by a control device 10. Alternatively, a separate timer may be provided. The waiting period can be advantageous because it has been found that contact fritting may affect a battery voltage level that may be measured. Hence, the waiting period can be selected such that the battery voltage may settle prior to a subsequent voltage measurement.

In step S105, the method may comprise an optional voltage measurement. For example, the control device may further be adapted to perform a voltage measurement. As shown in FIG. 3, a voltage divider comprising resistors 51, 52 may be provided. A measurement node, e.g. between resistors 51 and 52, may be connected to a measurement input 12 of the control device 10. Advantageously, the control device may be implemented using a microcontroller which is programmed to cause the microcontroller to perform the functions as described herein. For example, the measurement input 12 can be an analog-to-digital converter (ADC) input of the microcontroller. Accordingly, the control output 11 can be an output pin of the microcontroller that is adapted to provide a control signal to the switch 30. The switch may be temporarily opened during standby to control the automated contact fitting. It should be noted that the control device 10 does not necessarily have to wake up from standby to a full operational state but can remain in an intermediate standby state that provides limited functionality such as operating a timer, voltage measurement and control of automated contact fritting.

As shown in FIG. 5, the method may be performed repeatedly. In particular, control device (10) is adapted to cause the battery powered electrical appliance (1) to perform automated contact fritting of the battery contact 21, 22 at predetermined time intervals. For example, the automated contact fritting of the battery contact 21, 22 may be performed at least once in a time period of at least one of 48 hours, 36 hours, 24 hours, 18 hours, 12 hours, 8 hours, 6 hours and 4 hours. Thereby, the wetting threshold may remain at low level. This is particularly advantageous in combination with the use of a startup current of the motor 30 to provide the fritting current pulse. Because the automated contact fritting is performed at regular time intervals the required current pulse to achieve the contact fritting is sufficiently low to be effected by said startup current. In particular a very short activation, preferably even without setting the electric motor in motion, can achieve the desired contact fritting.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

It shall be understood that that the functions performed by the control device may be more generally performed by the battery powered electrical appliance for personal hygiene.

Hence, instead of a control device adapted to cause the battery powered electrical appliance for personal hygiene to perform a certain function, reference can also be made to the battery powered electrical appliance for personal hygiene adapted to perform a certain function. The control device may be implemented by one or more entities. In an advantageous embodiment, the control device can be implemented by circuitry comprising a microcontroller.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope. The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. Control device for a battery powered electrical appliance for personal hygiene, wherein the control device is adapted to cause the battery powered electrical appliance to perform automated contact fritting of a battery contact by controlling the battery powered electrical appliance such that a current pulse exceeding a wetting threshold is applied across the battery contact during a standby period, wherein the control device is adapted to cause the battery powered electrical appliance to apply the current pulse having a peak current of at least 100 mA.

2. Control device as claimed in claim 1, wherein the control device is adapted to cause the battery powered electrical appliance to apply the current pulse exceeding the wetting threshold across the battery contact by temporarily activating at least one of an electric motor and a heating element of the battery powered electrical appliance for personal hygiene.

3. Control device as claimed in claim 1, wherein the control device is adapted to cause the battery powered electrical appliance to temporarily activate the electric motor such that the electric motor draws a starting current exceeding the wetting threshold and to deactivate the electric motor within less than 10 ms, in particular to deactivate the motor prior to setting the electric motor in motion.

4. Control device as claimed in claim 1, wherein the control device is adapted to cause the battery powered electrical appliance to apply the current pulse having a peak current of at least one of at about 250 mA, at about 500 mA and at about 1 A; and a duration of about one of less than about 3 ms, less than about 1 ms and less than about 500 µs across the battery contact.

5. Control device as claimed in claim 1, wherein the control device is adapted to cause the battery powered electrical appliance to perform a sequence of automated contact fritting and a subsequent battery voltage measurement.

6. Control device as claimed in claim 5, wherein the control device is adapted to cause the battery powered electrical appliance to perform a sequence of automated contact fritting, followed by a waiting period and a subsequent voltage measurement after the waiting period, in particular wherein the waiting period is in a range of at least one of: between about 15 min and about 4 h, between about 20 min and about 3 h, between about 30 min and about 2 h, and between about 45 min and about 90 min.

7. Control device as claimed in claim 1, wherein the control device is adapted to cause the battery powered electrical appliance to perform automated contact fritting of the battery contact at predetermined time intervals.

8. The control device as claimed in claim 7, wherein the control device is adapted to cause the battery powered electrical appliance to perform automated contact fritting of the battery contact at least once in a time period of at least one of about 48 hours, about 36 hours, about 24 hours, about 18 hours, about 12 hours, about 8 hours, about 6 hours and about 4 hours.

9. Control device as claimed in claim 1, wherein the control device is adapted to cause the battery powered electrical appliance to perform automated contact fritting of the battery contact (a) at a predetermined time of the day, in particular in a time window between about 12 am and about 4 pm; and/or (b) at a predetermined time after usage of the battery powered electrical appliance for personal hygiene.

10. Control device as claimed in claim 1, wherein the control device is adapted to receive a trigger signal and to cause the battery powered electrical appliance to perform automated contact fritting of the battery contact in response to said trigger signal.

11. Battery powered electrical appliance for personal hygiene, the appliance comprising the control device as claimed in claim 1.

12. Battery powered electrical appliance for personal hygiene as claimed in claim 11, wherein the battery powered electrical appliance for personal hygiene is a hair removal device, in particular a shaver or epilator, or an electric toothbrush or massage device.

13. Battery powered electrical appliance for personal hygiene as claimed in claim 11, wherein the battery contact comprises an ignoble electrical contact for contacting the battery.

* * * * *